J. H. GERRER.
WHEELED SCRAPER.
APPLICATION FILED NOV. 15, 1909.
980,510.
Patented Jan. 3, 1911.
5 SHEETS—SHEET 1.
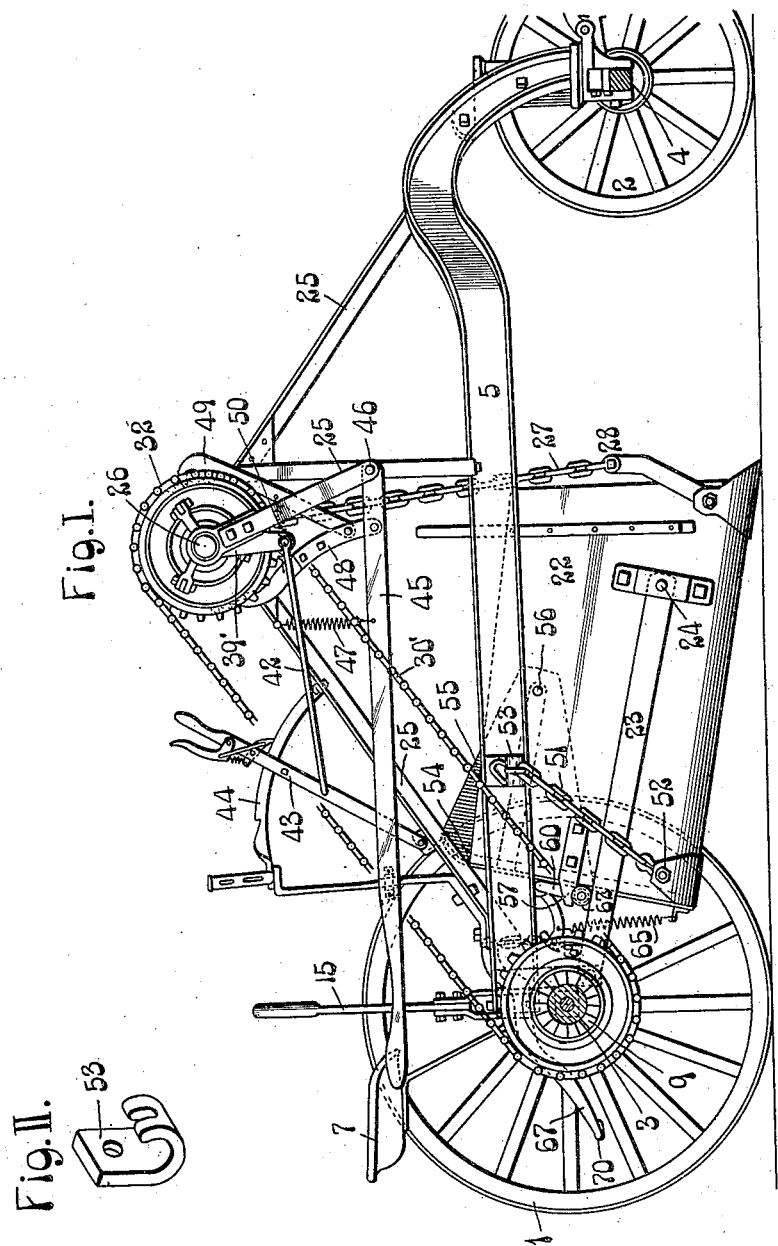
Attest
A. J. McCauley
E. B. ——
Inventor:
J. H. Gerrer
by ——
Att'y.

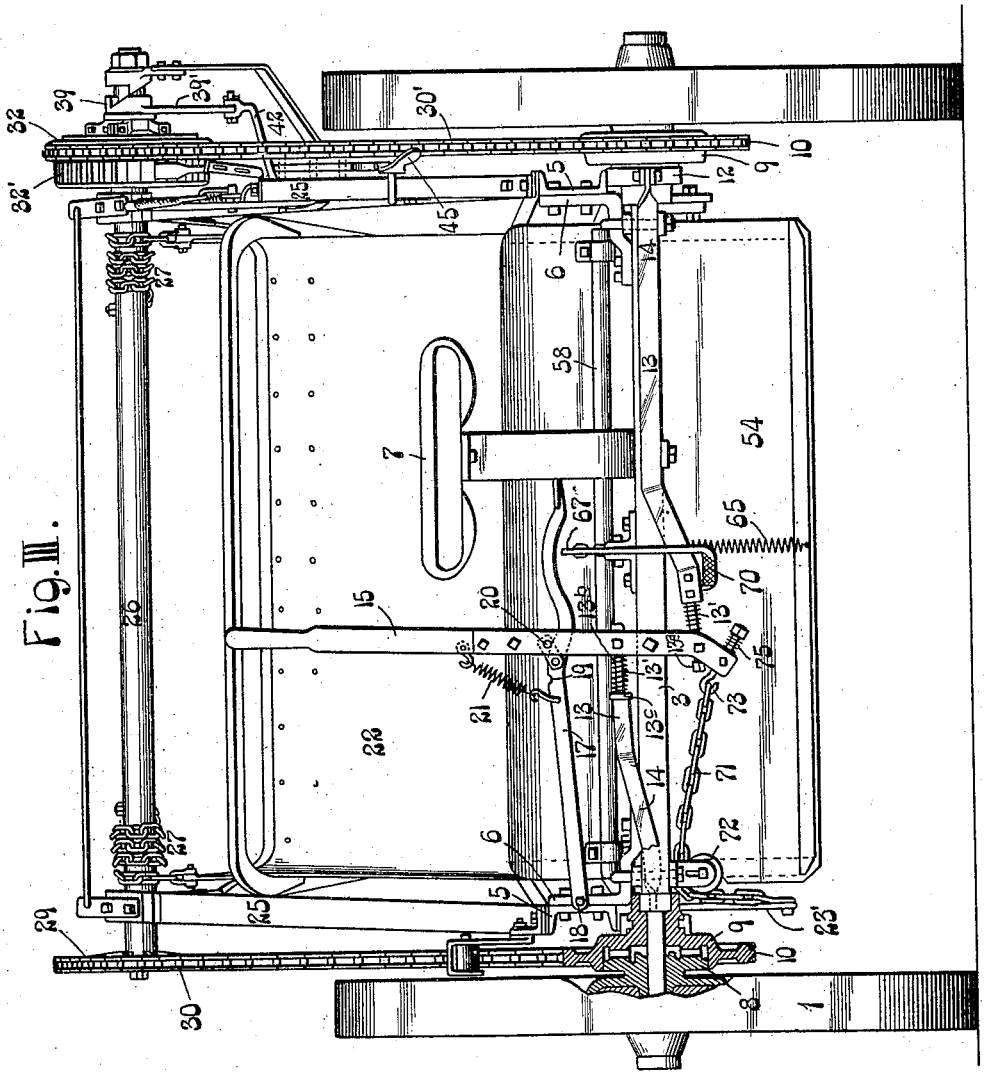

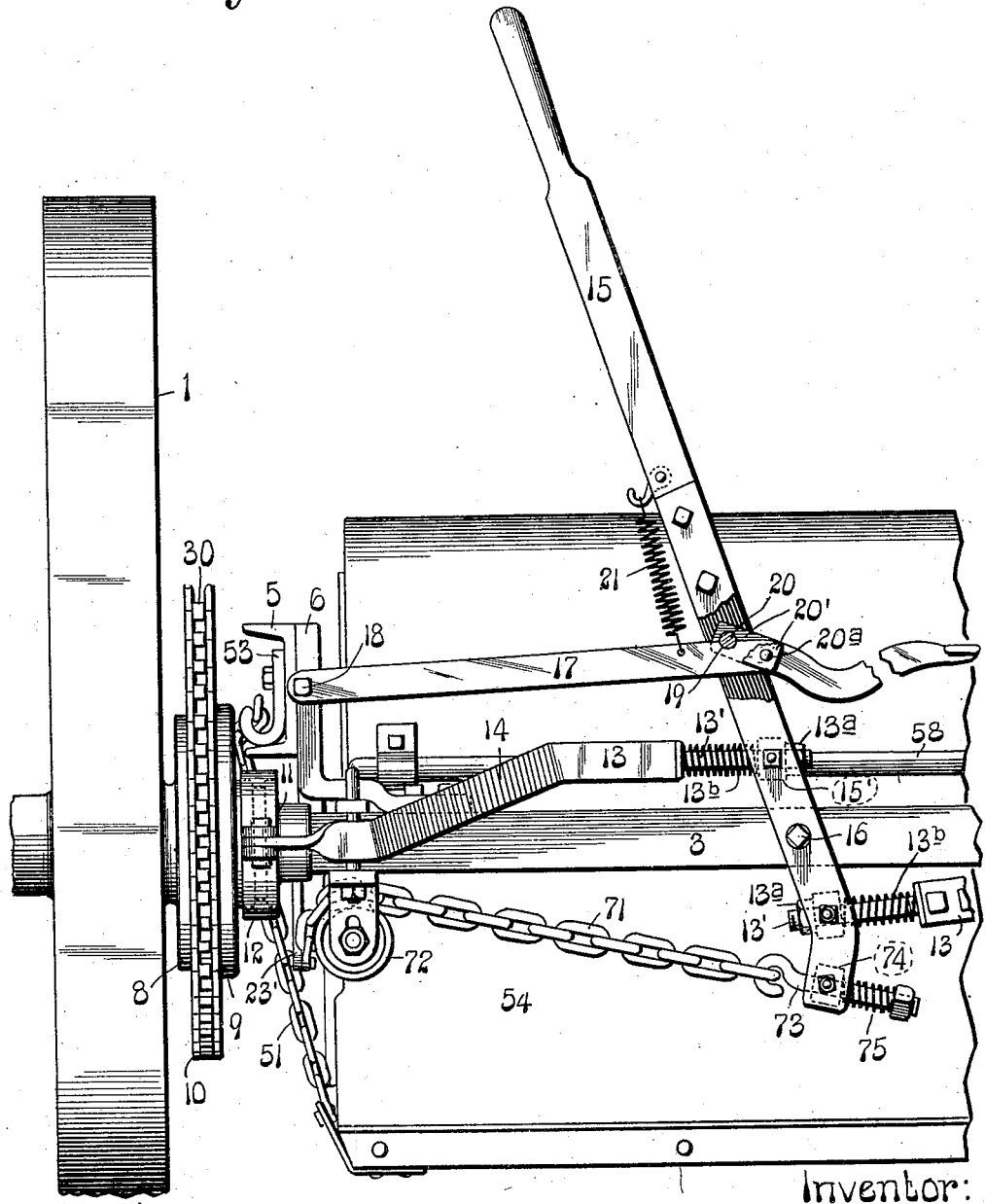

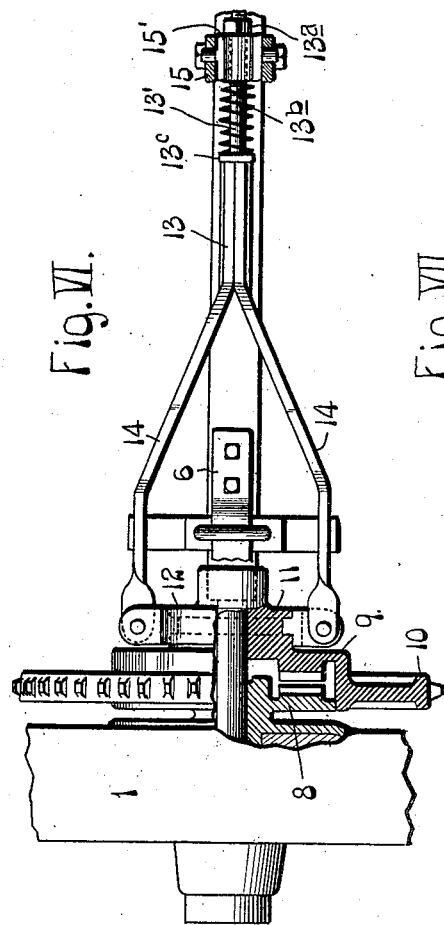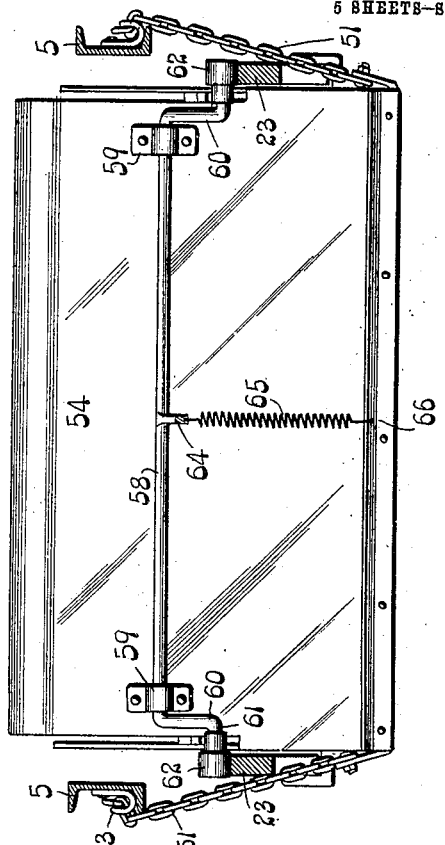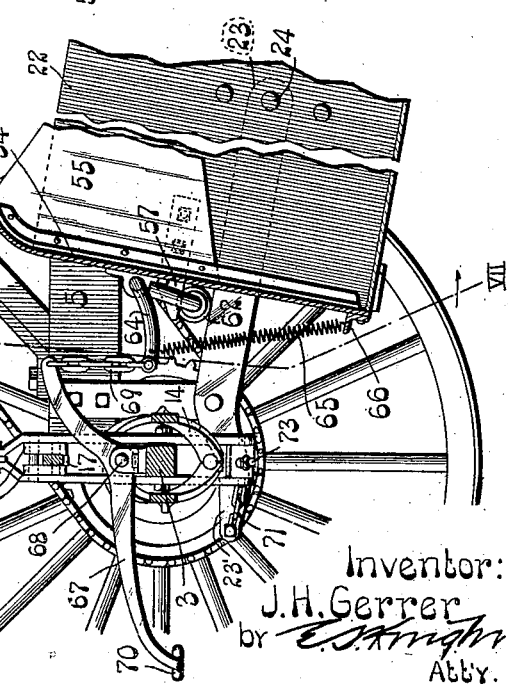

J. H. GERRER.
WHEELED SCRAPER.
APPLICATION FILED NOV. 15, 1909.
980,510.
Patented Jan. 3, 1911.
5 SHEETS—SHEET 5.
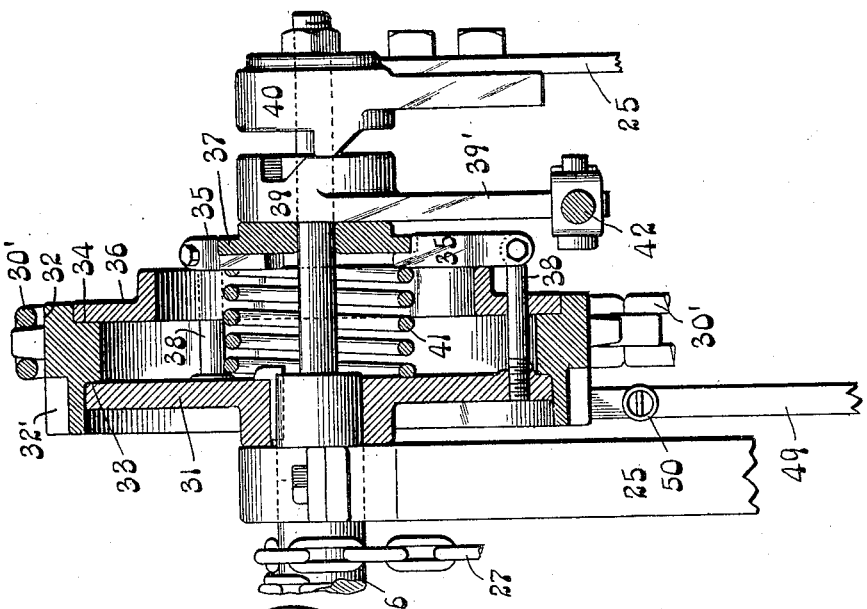
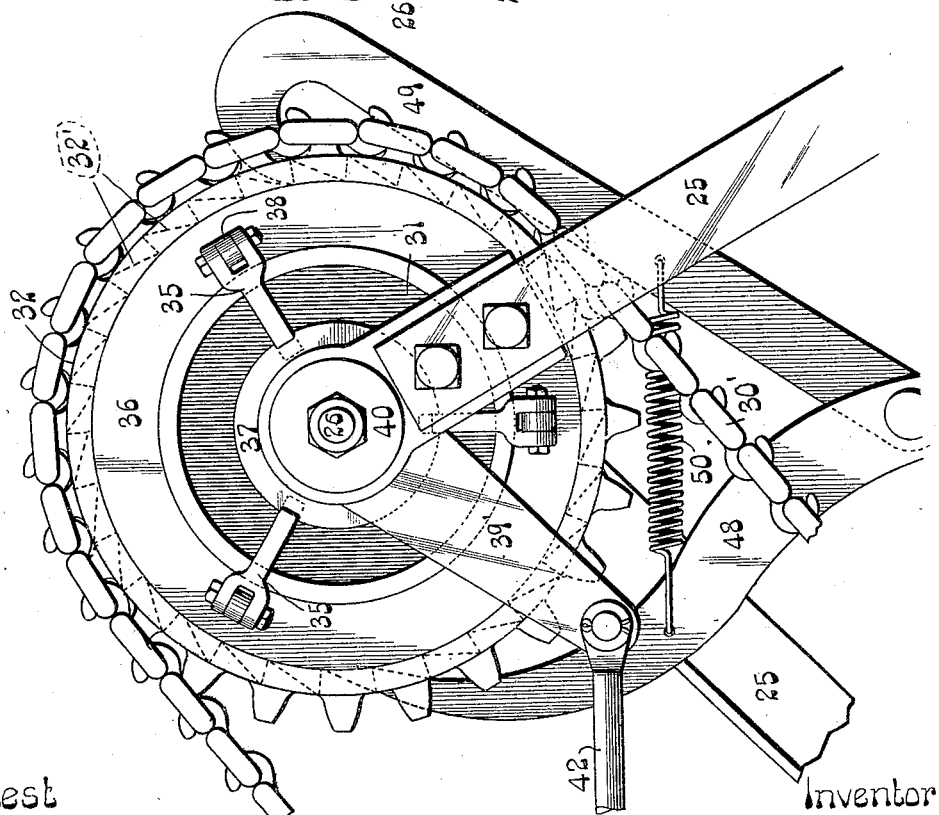
Attest
A. J. McCauley
E. B. Ring
Inventor
J. H. Gerrer
by E. Harrington
Atty.

UNITED STATES PATENT OFFICE.

JOHN H. GERRER, OF EAST ST. LOUIS, ILLINOIS, ASSIGNOR TO MANEY MANUFACTURING COMPANY, OF EAST ST. LOUIS, ILLINOIS, A CORPORATION.

WHEELED SCRAPER.

980,510.  Specification of Letters Patent.  Patented Jan. 3, 1911.

Application filed November 15, 1909. Serial No. 527,967.

*To all whom it may concern:*

Be it known that I, JOHN H. GERRER, a citizen of the United States of America, residing at East St. Louis, in the county of St. Clair and State of Illinois, have invented certain new and useful Improvements in Wheeled Scrapers, of which the following is a full, clear, and exact description, reference being had to the accompanying drawings, forming part of this specification.

My invention relates to a scraper for use in gathering earth and conveying it from one point to another, the invention having for its object the production of a machine of this character whereby the earth gathering pan may be readily controlled by an operator riding upon the machine in a manner to provide for the proper presentation of the pan to the ground in gathering a load, for the lifting of the pan after the load has been secured, for the dumping of the load, and for the return of the pan to load receiving position. Also to provide means whereby the end gate of the scraper pan is automatically locked in a closed position when the pan is lowered to dirt receiving position and unlocked when the pan is elevated for dumping action. Also, to furnish the scraper with detail structural features whereby its operation is made more efficient.

Figure I is a side elevation of the scraper, with the wheels at the near side omitted and the axle shown in cross section. Fig. II is an enlarged perspective view of a hook employed for the connection to the main frame of the means by which the rear end of the scraper pan is supported. Fig. III is a rear elevation of the scraper, with the scraper pan elevated, one of the clutches at the rear ground wheels being shown in section. Fig. IV is an enlarged partial rear elevation of the scraper with the pan in lowered position. Fig. V is an enlarged longitudinal section through the rear portion of the scraper. Fig. VI is an enlarged view, partly in plan, and partly in horizontal section, of the rear axle, a fragment of one of the ground wheels and the clutch associated with said ground wheel and axle. Fig. VII is an enlarged rear elevation of the scraper pan and the end gate locking device. Fig. VIII is an enlarged side elevation of the clutch associated with the winding shaft. Fig. IX is a view, partly in elevation and partly in section of the clutch shown in Fig. VIII.

The running gear of the scraper includes a pair of rear ground wheels 1, a pair of forward steering ground wheels 2, axles 3 and 4 to which said rear and forward ground wheels are respectively journaled and side beams 5 that are suitably connected to the forward axles and are supported at their rear ends by posts 6 mounted upon the rear axle 3.

7 is an operator's seat that is supported in such position that various levers, to be hereinafter described and by which the mechanism of the scraper is placed under control of the operator, may be readily actuated by the operator while riding upon the seat.

Each of the rear ground wheels has rigidly fitted to it a toothed clutch member 8, (see Figs. III and VI), that is adapted to receive a toothed clutch member 9 slidably mounted upon the rear axle and provided with a driving wheel 10 and with a shifter receiving collar 11 that receives a shifter band 12.

13 are operating rods having arms 14 connected to the shifter collars 12.

15 is a hand lever pivoted at 16 to the rear axle and to which the operating rods 13 are connected, in a manner to be hereinafter explained, at opposite sides of the point of pivotal support of the lever, in order that the operating rods may be operated simultaneously for the purpose of moving the clutch members 9 relative to the ground wheel clutch members 8.

17 is a foot keeper bar that is pivoted at 18 to a member of the running gear, preferably one of the posts 6. This keeper bar extends horizontally and transversely of the hand lever 15 and its free end is located beneath the operator's seat in order that it may be readily depressed by the operator placing his foot thereupon. The keeper bar is provided with a notch 19 that is adapted to receive the engagement of a catch pin 20 carried by the hand lever 15 and connected to the keeper bar by links 20' united to the keeper bar by a pivot pin 20ª, (see Figs. III and IV). The keeper bar is normally sustained in a position beneath said catch pin by a lift spring 21 that connects it to the hand lever. This construction provides for the seating of the catch pin 20 in the notch in the keeper bar when the hand lever is moved for the purpose of separating the clutch members 9 from the clutch members 8 and whereby said parts are held with the clutches released after the hand lever has been moved as stated. The hand and foot clutch controlling mechanism just described is intended to be utilized for the purpose of throwing the clutches out of action after they have been in operative condition for lifting the scraper pan, and the description of the machine will be resumed with the clutch members being understood to be in active engagement with each other and the hand lever 15 out of engagement with the keeper bar 17, as illustrated in Fig. III.

22 designates the pan of the scraper which is pivotally connected to the rear portion of the running gear by resistance bars 23, the forward ends of which are pivoted to the pan at 24, see Figs. I and V, whereby the resistance bars, while serving to restrain rearward movement of the pan in earth gathering action, permit tilting motion of the pan in order that it may be properly adjusted relative to the ground and elevated and tilted rearwardly for the purpose of dumping its contents.

25 designates framework surmounting the side beams 5 and serving as elevated supports for the scraper pan lifting and lowering mechanism.

26 is a winding shaft that is journaled in suitable bearing boxes supported by members of the framework 25 and to which shaft is connected a pair of lift chains or other flexible members 27 that are attached to the pan 22 near its forward end at 28. The winding shaft 26 is operated in part by a sprocket wheel 29 fixed to it at one of its ends and which receives an endless drive chain 30 that leads thereto from the wheel 10 of the clutch member 9 that is located at the corresponding side of the scraper. The winding shaft is also operated through the medium of an endless drive chain 30' that is operable upon the wheel of the clutch member 9 at the opposite side of the scraper from that just referred to and which coöperates with clutch mechanism associated with the winding shaft, as will now be set forth.

31, (see Fig. IX), is an inner clutch member keyed to the winding shaft 26.

32 is a toothed clutch ring that receives the drive chain 30' and which is provided internally with a shoulder face 33 adapted to receive the inner clutch member 31 in order that frictional engagement between these parts may be obtained for the purpose of causing transmission of power from said drive chain to the winding shaft 26.

36 is an outer clutch member located within the clutch ring 32 and is adapted to frictionally engage a shoulder face 34 of said clutch ring and which is adapted to be moved into frictional engagement with the shoulder face of the clutch ring through the medium of dogs 35 that bear against the outer face of said outer clutch member. The dogs 35 are pivoted to pins 38 that pass loosely through the outer clutch member 36 and are seated in the inner clutch member 31 so that when the dogs are moved to the outer clutch member 36, they act to move the clutch members 31 and 36 respectively to the shoulder faces 33 and 34 of the clutch ring 32. The winding shaft 26 has a reduced end, as seen in Fig. IX, which extends outwardly beyond the clutch members described and loosely fitted to this reduced end of the shaft is a collar 37 which bears against the dogs 35. The collar 37 is adapted to be moved inwardly by a notched shifter 39 loosely mounted on the reduced end of the winding shaft, whereby the dogs 35 are carried inwardly with the result of causing the clutch members 31 and 36 to be forced by the dogs into firm contact with the opposing internal shoulder faces 33 and 34 of the clutch ring 32. Arranged opposite to the shifter 39 upon the reduced end of the winding shaft 26 and supported by a rigid member of the framework 25 is a toothed member 40. The tooth of this member is adapted to bear against the outer end of the shifter 39, as seen in Figs. III and IX, when the described clutch mechanism is in operative position, and to rest in the notch in the shifter when the clutch mechanism is out of action. Between the inner clutch member 31 and the dogs 35 is an expansion spring 41, (see Fig. IX), by which said dogs are thrown outwardly to permit of the release of gripping action upon the clutch 32 by the clutch members 31 and 36 upon the entrance of the tooth of the member 40 into the notch in the shifter 39. The shifter 39 is provided with an arm 39' which is connected to a throw rod 42, (see Figs. I, VIII, and IX), that leads to a hand lever 43 pivoted to a member of the framework 25, and which is provided with a latch that is adapted to engage a rack 44 supported by said framework. The parts just mentioned provide for the rotation of the shifter 39 on the reduced end of the winding shaft 26, in order that the clutch mechanism controlled by said shifter may be thrown into and out of action. This clutch mechanism is maintained in operative condition at all times, except when the front end of the scraper pan 22 is to be lowered after it has been elevated, and at such time it is readily thrown out of action to permit free rotation of the winding shaft 26.

It is desirable at times to elevate the front end of the scraper pan manually, in order that it may clear obstructions that may be present in front of it, and to provide for the lifting of the pan by manual power, I make use of the following parts: 45 is a hand lever extending forwardly from the driver's seat 7, and pivotally connected at 46 to a member of the framework 25. This hand lever is normally supported by a lift spring 47 connecting it to the framework. 48 is a push pawl pivoted to the hand lever 45 and 49 is a pull pawl pivoted to the pawl 48. These two pawls engage ratchet teeth 32' at the periphery of the clutch ring 32, (see Figs. III, VIII and IX), to which they are yieldingly held by a draw spring 50. By raising and lowering the hand lever 45, the pawls 48 and 49 may be operated to cause them to impart rotation to the clutch ring 32, and the other clutch members associated with this ring being in operative engagement therewith, the winding shaft 26 may be rotated to wind the chains 27 thereon, and elevate the front end of the scraper pan. It should be noted that, previous to the winding operation of the shaft manually, as previously explained, the clutch associated with the rear ground wheels 1 may be thrown out of action.

The rear end of the scraper 22 is supported by swinging supports 51, preferably chains. These swinging supports are secured at 52 to the scraper pan near its rear end and near the bottom of each of the sides of the pan, and the upper ends of the supports are attached to the side bars 5 of the main frame of the scraper. The connection between the supports 51 and the main frame is an adjustable one in order that the supports may be shortened or lengthened to regulate the height of the rear end of the scraper pan and this adjustment, where the supports are in the form of chains, is provided for by the use of notched hooks 53 secured to the frame side bars 5 and which are adapted to receive links of the chains, (see Figs. I, II, IV and VII).

The scraper pan 22 is open at its rear end to provide for contents of the pan being dumped rearwardly therefrom when the forward end of the pan is elevated through the medium of the winding shaft 26 and the parts coöperable therewith. It should be here noted that when the forward end of the scraper pan is elevated, the resistance bars 23 are elevated, and the rear end of the pan first swings forwardly from the position in which it is seen in Figs. I and V, as permitted by the swinging supports 51, and then moves downwardly to provide for the pan occupying the position shown in Fig. III, for the dumping of its contents.

54 designates an end gate by which the rear end of the scraper pan is closed while the pan is being filled, and which is provided at its upper end with a pair of side arms 55, (see Figs. I and V), pivoted to the sides of the pan at 56, the pivotal points being located considerably forward of the rear end of the scraper pan to provide for the end gate partaking of a movement sufficient to completely open the back end of the pan. The scraper pan has secured to it at each of its sides a latch receiving arm 57 which projects rearwardly beyond the sides of the pan, (see Figs. I and V), which are adapted to be engaged by means for holding the end gate in a closed position to be next described.

58 designates a latch rod rockably mounted in bearing boxes 59 secured to the end gate 54 and which is provided with arms 60 having horizontal extensions 61 which extend outwardly and over the resistance bars 23, the said extensions being provided with rollers 62 adapted to operate on the resistance bars. The latch rod 58 is provided with an operating lever 64 to which is connected one end of a controlling spring 65, the other end of said spring being connected at 66 to the end gate 54. 67 is a trip lever pivotally supported at 68, and which is united to the lever 64 by a pull connection 69. The rear arm of the trip lever 67 is provided with a foot piece 70 upon which pressure may be exerted to operate said trip lever, and, by moving the lever 57 upwardly, rotate the latch rod 58, so that the horizontal extensions 61 of its arms 60 are withdrawn from the position in which they are seen in Figs. I and V. When the end gate is in closed position, as seen in Figs. I and V, the parts just described occupy the positions in which they are seen in these views, and also in Fig. VII, at which time the horizontal extensions 61 of the arms of the latch rod 58, being present beneath the latch receiving arms 57 carried by the sides of the scraper pan, while the rollers 62 rest upon the resistance bars 23. It will therefore be seen that the end gate is efficiently maintained in a closed position through the medium of the parts described, and it is maintained in such closed position until such time as it may be desired to open it to dump the contents of the scraper pan after it has been elevated. The releasing of the end gate is accomplished by the simple act of actuating the trip lever 67 to cause it to exert a pull upon the lever 64 to partially rotate the latch rod 58, with the result of withdrawing the horizontal arms of the arms 60 from positions beneath the latch receiving arms 57.

I provide in my scraper means for automatically throwing the clutch members associated with the ground wheels 1 out of action when these clutches have been operated sufficiently to provide for the scraper pan being elevated in a loaded condition, thereby relieving the driver or operator of the necessity of throwing these clutches out of action at the proper time, and avoiding the possibility of injury that would be incident to failure to release the clutches by the time that the scraper pan has been elevated to the greatest degree permissible by the lifting mechanism. The automatic release of said clutches is accomplished by the following parts: 23' is a lever arm extending rearwardly from the point of pivotal connection of one of the resistance bars 23 to the frame of the scraper, (see Figs. III, IV, and V), and 71 is a flexible connection, preferably a chain, attached at one end to said lever arm and its other end being attached to the lower end of the hand lever 15. The connection 71 operates upon a sheave 72 supported by the rear axle 3, and said connection is preferably united to the lever 15 by an eye bolt 73 that extends through a box 74 mounted in said lever, and has associated with it a cushion spring 75 which provides for the connection 71 being a yielding one, in order that there may be no liability of its becoming broken by sudden or excessive draft thereupon.

I wish to next direct attention to the adjusting means which constitute the connection between the operating rods 13 and the lever 15. Each operating rod 13 is provided at its inner end with a stem 13', (see Fig. VI), which passes loosely through a swivel box 15' mounted in the lever 15, as seen most clearly in Fig. VI, and upon the outer end of each stem is an adjusting nut 13ª.

13ᵇ are cushion springs interposed between the swivel boxes 15' and shoulders 13ᶜ at the rear ends of the stems 13'. It will be readily apparent that either operating rod 13 may be drawn inwardly relative to the lever 15 when the nuts 13ª are moved inwardly on the stems 13' and permitted to move outwardly relative to the lever 15 when the nuts are moved in a reverse direction on the stems. Consequently the operating rods 13 may be each so adjusted relative to the lever 15 as to provide for like movement of each clutch member 9 toward the clutch member 8 that coöperates with it, in order that both of clutches operated from the ground wheels 1 may be properly placed into operative positions.

In the practical use of my scraper, the operation is, in general, as follows: When the scraper pan is in the position illustrated in Figs. I, IV, V, and VII, the parts of the machine are in position for service in gathering a load of earth into the pan. At this time the clutch members associated with the rear ground walls and rear axle are out of action. It should be assumed that the hand lever 15 is in the position shown in Fig. III, so that the catch pin 20 is directly above the pivot 16 of the lever 15, in which position it is held by the links 20' connecting the keeper bar to the lever 15 and upheld by the lift spring 21, whereby the axle carried clutch members 9 are held out of engagement with the wheel carried clutch members 8. Now when the scraper pan has been filled, the operator depresses the keeper bar 17 and moves the lever 15 to actuate the operating rods 15, with the result of carrying the clutch members 9 into engagement with the wheel clutch members 8. The clutch members 9 are then permitted to impart movement to the drive chains 30 and 30', and said drive chains transmit motion to the winding shafts 26, with the result of winding the lift chains 27 upon said shaft to elevate the scraper pan. The operator in moving the lever 15 to throw the clutch members 9 into engagement with the clutch members 8 shifts it from the position in which it is seen in Fig. III to the position shown in Fig. IV, whereby the links 20' are swung to the position in which they are seen in Fig. IV, and the catch pin is entered into the notch 19 in the keeper bar 17 to act as a restraining member with respect to the hand lever 15. As has previously been stated, the scraper pan 22 partakes of an upward and forward movement when it is elevated and tilted into load dumping position. As a consequence of this movement, the lever arm 23' extending rearwardly from the point of pivotal attachment of one of the resistance bars 23 to the main frame of the scraper is moved downwardly and forwardly from the position in which it is seen in Fig. IV. As this lever arm partakes of the movement mentioned, it exerts, at the proper moment, a pull upon the connection 71 whereby said connection is caused to exert a pull upon the lower end of the lever 15 after the scraper pan has been elevated to a predetermined degree, and with the result of causing said lever 15 to be thrown from the position in which it is seen in Fig. IV to that in which it is seen in Fig. _ to cause release of the clutch members 9 from the clutch members 8, without the necessity of the driver or operator actuating the lever 15 manually. The clutch members 9 having been disengaged from the clutch members 8, it will be seen that the catch pin 20 occupies such position relative to the point of pivotal support of the lever 15, when in the position in which it is shown in Fig. IV, as to permit of its being forced out of the notch 19 in the keeper bar 17 when a strong pull is exerted upon said lever by the connection 71, notwithstanding the fact that said catch pin affords sufficient resistance to hold the lever 15 from movement at any other time while it is present in the notch in the keeper bar. The only further action necessary to dump the load gathered by the scraper pan is the actuation of the trip lever 67 to release the latch device actuable thereby, in order that the end gate 54 of the scraper pan may swing into open position. The operation of these parts has been hereinbefore fully set forth. It should be further noted with respect to the operation of this scraper that when the scraper pan is elevated and the forward ends of the resistance bars are carried upwardly therewith, said resistance bars are carried into firm and positive engagement with the rollers 62 carried by the arms of the lock rod 58, (from which they have been previously separated, although located beneath the latch receiving arms 57); and, as a consequence, the horizontal extensions of said arms become clamped between the resistance bars and the latch receiving arms to remain in such clamped condition for the purpose of holding the end gate closed until such time as it is desired to release the end gate and dump the load from the scraper pan, which releasing action is accomplished by the actuation of the latch rod in the manner previously explained.

I claim:—

1. In a wheeled scraper, the combination of a scraper pan, a running gear to which said pan is attached and which includes a ground wheel, a swinging member movable with said pan, a clutch adapted to receive power from said ground wheel, mechanism actuated by said clutch for elevating said scraper pan, and means connecting said swinging member and a member of said clutch whereby said clutch is automatically thrown out of action when the pan is elevated, substantially as set forth.

2. In a wheeled scraper, the combination of a scraper pan, a running gear which includes a ground wheel, a rigid member pivoted to said pan and to said running gear, a clutch adapted to receive power from said ground wheel, mechanism actuated by said clutch for elevating said scraper pan, and means connected to said rigid member and to a member of said clutch adapted to automatically throw said clutch out of action when said pan is elevated, substantially as set forth.

3. In a wheeled scraper, the combination of a scraper pan, a running gear to which said pan is attached and which includes a ground wheel, a resistance bar pivotally connecting said pan to said running gear and which is provided with a lever arm, a clutch adapted to receive power from said ground wheel, mechanism actuated by said clutch for elevating said scraper pan, and means providing connection between said lever arm and a member of said clutch whereby the clutch is thrown out of action when the pan is elevated, substantially as set forth.

4. In a wheeled scraper, the combination of a scraper pan, a running gear including a ground wheel, a resistance bar pivotally connected to said pan and to said running gear, a clutch adapted to receive power from said ground wheel, mechanism actuated by said clutch for elevating said scraper pan, and means whereby said clutch is automatically thrown out of action, comprising a flexible connection between said resistance bar and a member of said clutch.

5. In a wheeled scraper, the combination of a scraper pan, a running gear frame, a resistance bar pivotally connected to said pan and to said running gear frame and which is provided with a lever arm, an axle mounted in said ground wheel and forming a support for said frame, a clutch, the members of which are carried by said ground wheel and axle, means operated by said clutch for elevating said scraper pan, and flexible means operable through the medium of the lever arm of said resistance bar for automatically throwing said clutch out of operation.

6. In a wheeled scraper, the combination of a scraper pan, a running gear to which said pan is attached and which includes a ground wheel, a clutch adapted to receive power from said ground wheel which comprises a shiftable member, an operating rod for the shiftable member of said clutch, a lever connected to said operating rod, means for holding said lever in a stationary position, a resistance bar pivotally connected to the running gear and scraper pan and movable with said pan, and mechanism actuated by said clutch for elevating said scraper pan, and a connection between said resistance bar and said lever whereby said lever is actuated to impart movement to said operating rod and automatically throw said clutch out of action when said scraper pan is elevated.

7. In a wheeled scraper, the combination of a scraper pan, a running gear to which said pan is attached, and which includes a ground wheel, a clutch adapted to receive power from said ground wheel and which comprises a movable member, an operating rod for the movable member of said clutch, a lever to which said operating rod is connected, mechanism actuated by said clutch for elevating said scraper pan, a keeper having pivotal connection with said lever adapted to restrain it from movement, and means operable in conjunction with said scraper pan whereby said lever is released from the restraining influence of said keeper and is actuated to move the operating rod to disengage the movable clutch member from the clutch member companionable therewith.

8. In a wheeled scraper, the combination of a scraper pan, a running gear to which said pan is attached, and which includes a ground wheel, a clutch adapted to receive power from said ground wheel and which comprises a movable member, an operating rod for the movable member of said clutch, a lever to which said operating rod is connected, mechanism actuated by said clutch for elevating said scraper pan, a keeper having pivotal connection with said lever adapted to restrain it from movement, means operable in conjunction with said scraper pan whereby said lever is released from the restraining influence of said keeper and is actuated to move the operating rod to disengage the movable clutch member from the clutch member companionable therewith, the pivotal connection between said lever and keeper comprising a catch pin carried by said lever and a link pivoted to said catch pin and said keeper.

9. The combination with a scraper pan and an end gate pivoted thereto, of means for holding said end gate in a closed position, said means comprising a rockable latch rod between its top and bottom, carried by the end gate and having arms, the said latch rod extending transversely of the end gate, and latch receiving arms carried by said scraper pan at its sides, and adapted to be moved into engagement with said latch rod arms.

10. The combination with a scraper pan and an end gate pivoted thereto, of a latch rod rockably supported by said end gate and provided with crank arms, the said latch rod extending transversely of the end gate between its top and bottom, latch receiving arms carried by said scraper pan at its sides, and adapted to receive the arms of said latch rod, and means for imparting partial rotation to said latch rod, to move its arms out of engagement with said latch receiving arms.

11. In a wheeled scraper, the combination of a scraper pan, a running gear, a pair of resistance bars pivotally connected to said pan and to said running gear, an end gate pivotally connected to said scraper pan, latch receiving arms carried by said scraper pan and located above said resistance bars, and a rockable latch rod carried by said end gate and having arms adapted to be moved into position between said resistance bars and latch receiving arms to hold said end gate in a closed position.

In testimony whereof, I have hereunto affixed my signature, this 12th day of November, 1909.

JOHN H. GERRER.

In the presence of—
M. C. HAMMON,
E. B. LINN.